US008322743B1

United States Patent
Klein

(10) Patent No.: US 8,322,743 B1
(45) Date of Patent: Dec. 4, 2012

(54) GOOSENECK TRAILER HITCH ALIGNMENT APPARATUS

(76) Inventor: Larry Klein, Sanger, TX (US)

(*) Notice: Subject to any disclaimer, the term of this patent is extended or adjusted under 35 U.S.C. 154(b) by 0 days.

(21) Appl. No.: 13/118,529

(22) Filed: May 30, 2011

(51) Int. Cl.
*B60D 1/40* (2006.01)

(52) U.S. Cl. ........................................ 280/477

(58) Field of Classification Search ............ 280/477; 172/272; 340/436, 431, 425.5; 33/264
See application file for complete search history.

(56) References Cited

U.S. PATENT DOCUMENTS

| | | | | |
|---|---|---|---|---|
| 3,720,000 A | * | 3/1973 | Schlegel | 33/264 |
| 3,774,149 A | * | 11/1973 | Bennett | 340/431 |
| 3,901,536 A | * | 8/1975 | Black | 280/477 |
| 4,187,494 A | * | 2/1980 | Jessee | 280/477 |
| 5,269,554 A | * | 12/1993 | Law et al. | 280/477 |
| 5,290,056 A | * | 3/1994 | Fath, IV | 33/264 |
| 5,518,263 A | * | 5/1996 | Owens | 280/477 |
| 6,273,448 B1 | * | 8/2001 | Cross | 280/477 |
| 7,207,589 B2 | * | 4/2007 | Givens | 280/477 |
| 7,584,983 B2 | * | 9/2009 | McKenney | 280/477 |
| 2002/0100175 A1 | * | 8/2002 | King | 33/264 |
| 2002/0125685 A1 | * | 9/2002 | White | 280/504 |
| 2003/0051654 A1 | * | 3/2003 | Jarosek et al. | 280/477 |
| 2005/0173891 A1 | * | 8/2005 | LeBouef | 280/477 |
| 2005/0218626 A1 | * | 10/2005 | Kwilinski | 280/477 |
| 2006/0125209 A1 | * | 6/2006 | LeBouef | 280/477 |
| 2008/0067782 A1 | * | 3/2008 | Richardson | 280/477 |

* cited by examiner

*Primary Examiner* — Lesley D Morris
*Assistant Examiner* — Daniel Yeagley
(74) *Attorney, Agent, or Firm* — Michael Diaz

(57) ABSTRACT

A trailer alignment apparatus for aligning a trailer with a hitch on a vehicle. The apparatus includes an elongated member having an upper end and an opposite lower end. A light is located on the upper end and a base is locating on the lower end. The base is attachable to a base surface of the vehicle. The elongated member is sized for a portion of the elongated member to be visible when seated on the base surface of the vehicle. The apparatus also includes a contact mechanism for sensing when a portion of the elongated member is touched by the trailer. The light illuminates when the contact mechanism senses the trailer touching the contact mechanism. A driver of the vehicle laterally aligns the elongated member with the trailer and stops the vehicle when the light illuminates.

17 Claims, 8 Drawing Sheets

GOOSENECK TRAILER HITCH ALIGNMENT APPARATUS

BACKGROUND OF THE INVENTION

1. Field of the Invention

This invention relates to trailer hitches. Specifically, and not by way of limitation, the present invention relates to manually aligning a gooseneck trailer hitch with a gooseneck trailer.

2. Description of the Related Art

It is quite common to pull a trailer from a truck or other vehicle. Conventional trailer hitches for attaching a towing vehicle to a trailer are well known. Typically, trailer hitches include a socket on a tongue of a trailer and a ball mounted on a towing bar at the towing vehicle. During towing operations, the ball is connected to the socket on the trailer tongue. Such a conventional towing configuration, which uses a towing bar on the back of the vehicle, is acceptable for weights up to 10,000 pounds, depending on the type of truck and trailer hitch used. However, for towing heavier weights, a gooseneck trailer hitch is often used. Unlike regular hitches that extend from the back of the towing vehicle, gooseneck hitches, and the closely-related fifth wheel hitches, are anchored through the bed of a pickup truck. Gooseneck hitches use a hitch ball to lock into place, while fifth wheel hitches use a wheel-shaped plate to accomplish the connection. Besides their strength, gooseneck hitches are also popular because the types of trailers they pull are able to make tighter turns than the ones that connect off the back of the towing vehicle.

FIG. 1 is a side view of a common gooseneck trailer hitch system 10 for a truck 12. Typically, the truck includes a truck bed 14 having a gooseneck hitch 16 or ball anchored to the truck bed. The truck may tow a trailer 20 by utilizing the gooseneck hitch. Typically, the trailer includes a gooseneck towing extension 22 having a socket 24 for connecting to the gooseneck hitch 16. To connect the hitch to the trailer, the driver of the towing vehicle must move the towing vehicle rearwardly until the gooseneck hitch 16 is laterally aligned under the socket of the towing extension. However, it can be very difficult to maneuver the hitch into the proper position since the hitch is out of the vision of the driver. Additionally, it is sometimes difficult to align the hitch and trailer, even with the assistance of another person.

In order to overcome the difficulties encountered in properly aligning the gooseneck hitch and the trailer extension and socket with each other, it would be advantageous to have an apparatus which allows a driver to easily align the hitch with the gooseneck trailer, without the assistance of an additional person. It is an object of the present invention to provide such an apparatus.

SUMMARY OF THE INVENTION

In one aspect, the present invention is directed to a trailer alignment apparatus for aligning a trailer with a hitch on a vehicle. The apparatus includes an elongated member having an upper end and an opposite lower end. A light is located on the upper end and a base is locating on the lower end. The base is attachable to a base surface of the vehicle. The elongated member is sized for a portion of the elongated member to be visible when seated on the base surface of the vehicle. The apparatus also includes a contact mechanism for sensing when a portion of the elongated member is touched by the trailer. The light illuminates when the contact mechanism senses the trailer touching the contact mechanism. A driver of the vehicle laterally aligns the elongated member with the trailer and stops the vehicle when the light illuminates.

In another aspect, the present invention is directed to a method of aligning a vehicle with a trailer using an alignment apparatus. The alignment apparatus has an elongated member with a light on an upper side and a base attachable to a base surface of the vehicle on a lower side. The method begins by attaching the alignment apparatus to the base surface of the vehicle. Next, the alignment apparatus is aligned with the trailer. The light then illuminates when the trailer contacts an outer surface of the elongated member. Upon seeing the illuminated light, the vehicle is stopped.

In another aspect, the present invention is directed to a trailer alignment system for aligning a trailer with a hitch on a vehicle. The system includes a vehicle having a hitch, a gooseneck trailer, and a trailer alignment apparatus for aligning the trailer with the hitch in the vehicle. The apparatus includes an elongated member having an upper end and an opposite lower end. A light is located on the upper end and a base is locating on the lower end. The base is attachable to a base surface of the vehicle. The elongated member is sized for a portion of the elongated member to be visible when seated on the base surface of the vehicle. The apparatus also includes a contact mechanism for sensing when a portion of the elongated member is touched by the trailer. The light illuminates when the contact mechanism senses the trailer touching the contact mechanism. A driver of the vehicle laterally aligns the elongated member with the trailer and stops the vehicle when the light illuminates.

DESCRIPTION OF THE INVENTION

Figure 1:
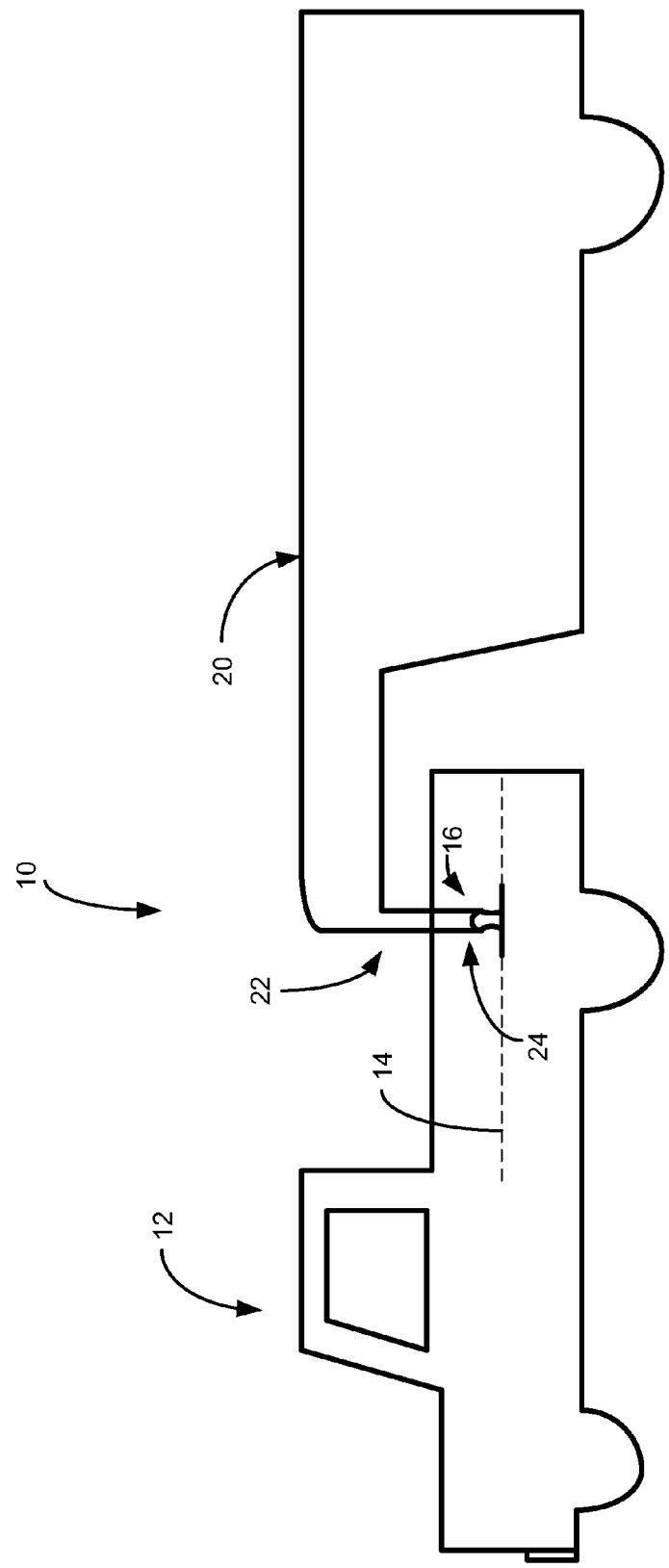
FIG. 1 is a side view of a common gooseneck trailer hitch system for a truck.
Figure 2:
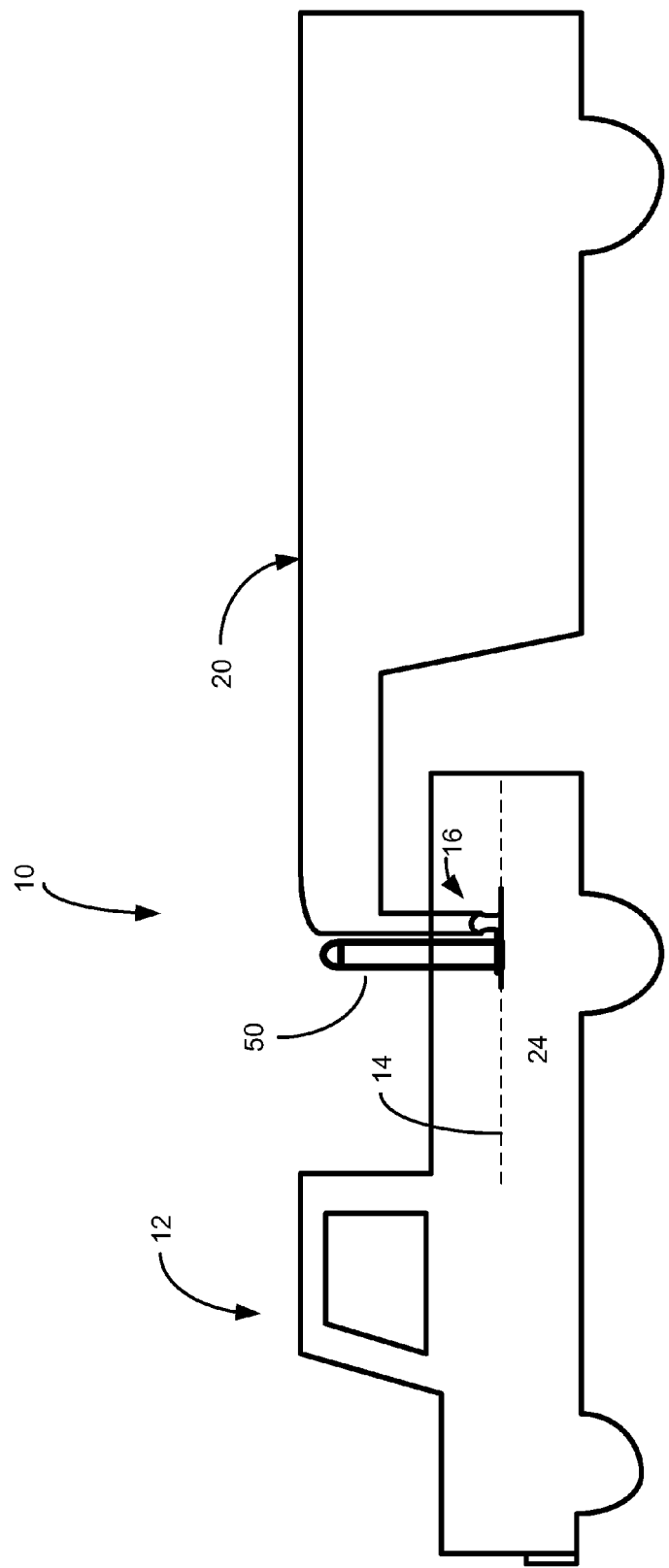
FIG. 2 is a side view of a trailer alignment apparatus attached to the truck bed of the truck in the preferred embodiment of the present invention.

The present invention is an apparatus for aligning a gooseneck hitch with a gooseneck trailer. FIG. 2 is a side view of a trailer alignment apparatus 50 attached to the truck bed 14 of the truck 12 in the preferred embodiment of the present invention. The alignment apparatus 50 extends out of the truck bed to such an extent that a driver of the truck can easily see the alignment apparatus 50.

Figure 3:
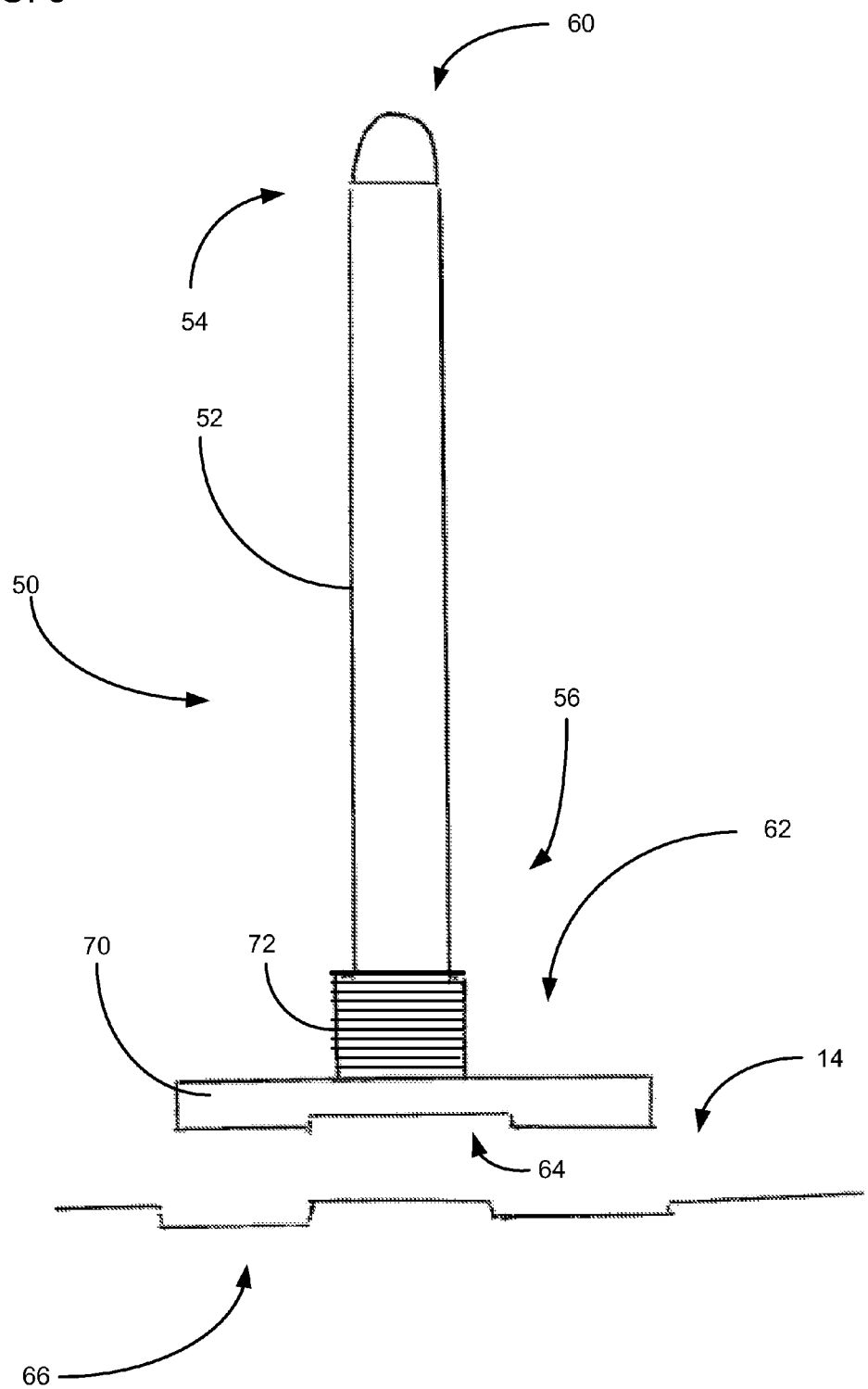
FIG. 3 is an enlarged view of the alignment apparatus of FIG. 2.

FIG. 3 is an enlarged view of the alignment apparatus 50 of FIG. 2. The alignment apparatus includes a main elongated member 52 with an upper end 54 and an opposite lower end 56. As stated above, the length of the alignment apparatus 50 is sufficiently long enough that the driver can easily see the upper end of the alignment apparatus. In one embodiment, the alignment apparatus 50 is approximately 24 inches in length. The elongated member may be constructed out of any resilient material, such as PVC, plastic or metal. In one embodiment, the elongated member is tubular in shape.

On the upper end 54 of the alignment apparatus 52 is a light 60. The light may be an illumination apparatus which is visible to the driver and provides a warning to the driver when an object contacts the elongated member 52. The light may be any color, such as red or white. In addition, the light may be a light-emitting diode (LED) or a conventional light bulb commonly used in vehicles. The light may be powered by a battery source located within the interior of the alignment apparatus 50. In an alternate embodiment of the present invention, the light may be powered by a solar panel (not shown) or by the truck's electrical system.

On the lower end 56 is a base 62. The base 62 is attached to the truck bed 14. In one embodiment, the base 62 includes an indentation 64 to conform in size and shape to a contoured floor 66 of the truck bed 14. In addition, the base is attached by an attaching mechanism 68. In one embodiment of the present invention, the attaching mechanism is a magnet 70 embedded in the base 62. The magnet is of sufficient strength to allow the base and alignment apparatus to remain in place during the alignment process. In other embodiments, the base may be attached to the truck bed by other attachment devices, such as hook and pile strips, bolts, etc.

In addition, between the base 62 and elongated member 52 may be an optional spring 72 to enable the elongated member to move if impacted by another object, thereby preventing damage to the alignment apparatus 50.

Figure 4:
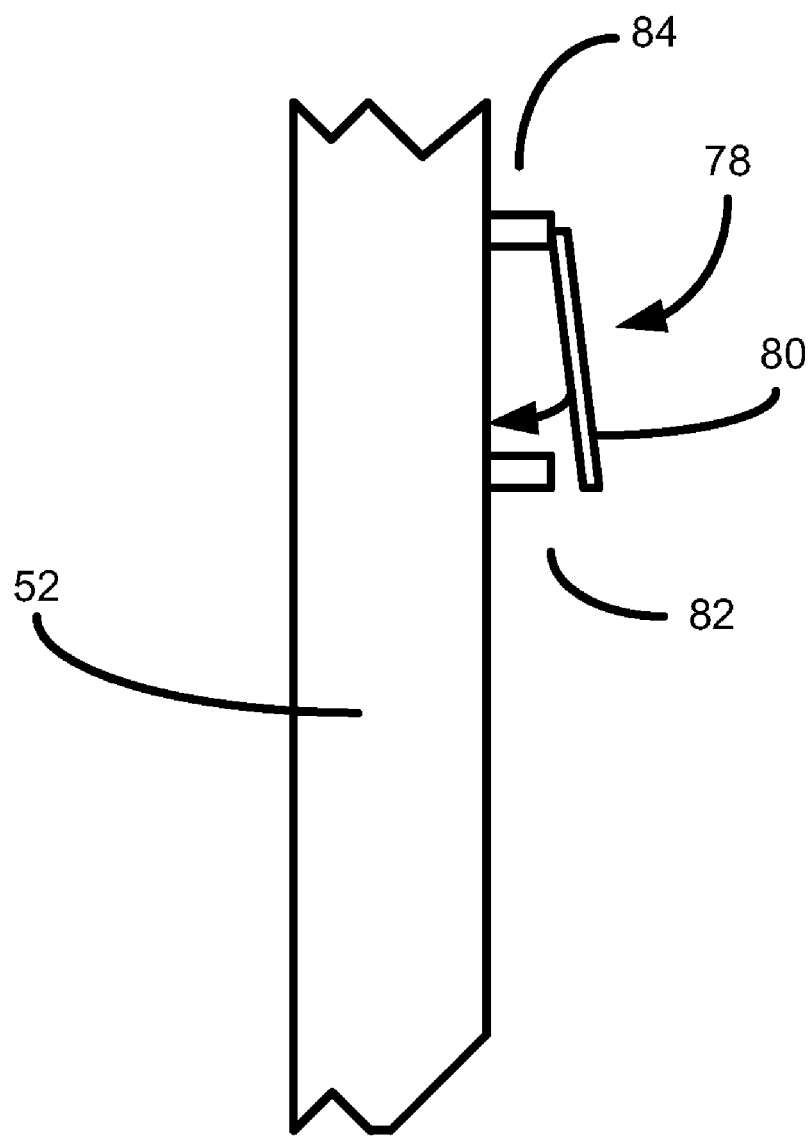
FIG. 4 is a partial enlarged side view of a side portion of the elongated member with a contact mechanism in an opened position.

FIG. 4 is a partial enlarged side view of a side portion of the elongated member 52 with a contact mechanism 78 in an opened position. The contact mechanism is affixed to the elongated member and includes a contact plate 80 hinged to a mount 82. On an opposite side of the mount, is a contact point 84. The contact plate is biased to a slight opened position adjacent the contact point. The light may be wired in such a fashion that wiring from the light to a power source runs through the contact plate and contact point. With the contact plate hinged open, the connection is broken between the light and the power source.

Figure 5:
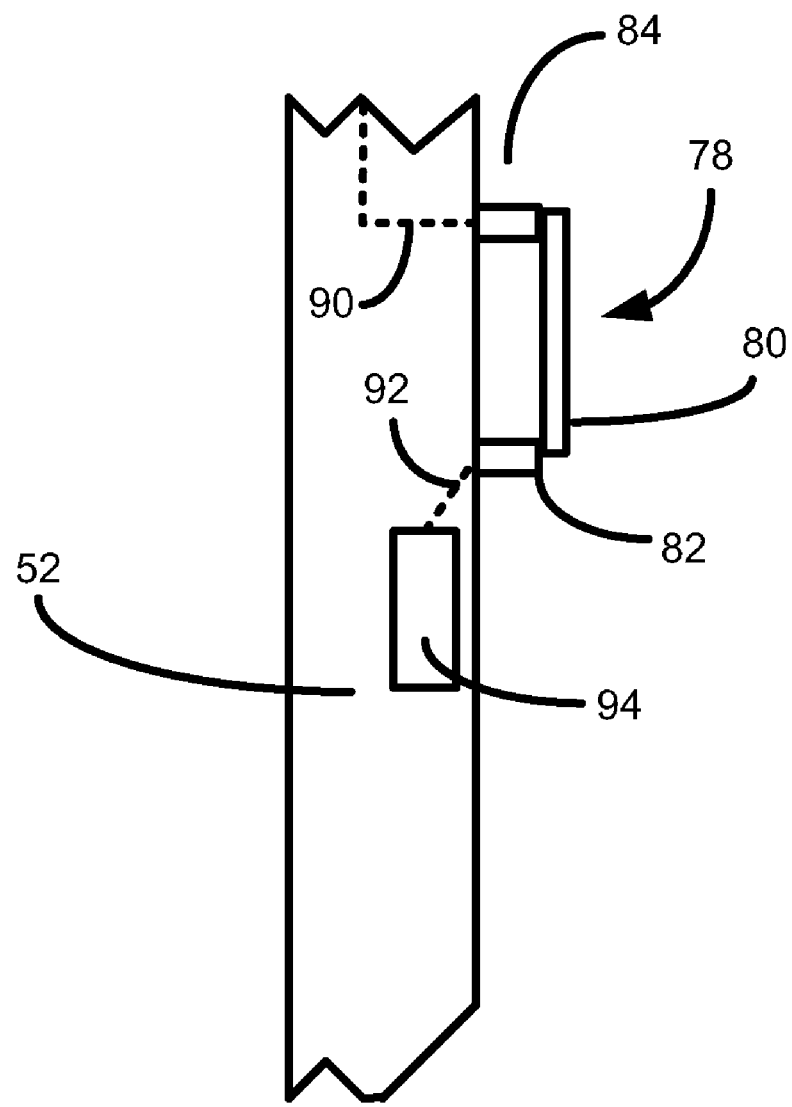
FIG. 5 is a side view of the contact plate touching the contact point.

FIG. 5 is a side view of the contact plate touching the contact point 84. Upon force being applied to the contact plate, the contact plate pivots and touches the contact point 84, thereby forming a connection between the light and power source. In particular, FIG. 5 illustrates a wire 90 connected to the light 60. The wire is connected to the mount 82. A second wire 92 runs from the contact point to a battery 94. When the contact plate touches the contact point, a connection is created between the wires 90 and 92. Although FIGS. 4 and 5 illustrate a mechanism for powering the light, the present invention may utilize any mechanism which senses the trailer extension contacting the elongated member, such as a pressure sensor, and still remain in the scope of the present invention. The trailer alignment apparatus 50 may also include a power switch (not shown) to enable use of the apparatus. The power switch enables power to be supplied from the power supply to the light when the contact mechanism is actuated.

With reference to FIGS. 1-5, the operation of the trailer alignment apparatus 50 will now be explained. First, the trailer alignment apparatus 50 is attached to the truck bed 14. In one embodiment, the alignment apparatus is attached by using a magnet 70 in the base 62. The base is then mounted on the truck bed 14, whereby the magnetic force of the magnet on the steel truck bed holds the alignment apparatus in place. The alignment apparatus is positioned adjacent and just behind the gooseneck trailer hitch 16 affixed to the truck bed (between the driver of the truck and the trailer hitch). With the alignment apparatus in place, the elongated member 52 extends out of the truck bed to provide a visual position of the hitch 16 lying in the truck bed. The trailer alignment apparatus 50 may also include a power switch (not shown) to enable use of the apparatus. The power switch enables power to be supplied from the power supply to the light when the contact mechanism is actuated. Prior to using, the user may turn on the power switch to use the apparatus. When not in use, the power switch may be turned to prevent inadvertent activation of the apparatus. Next, the driver visually aligns laterally the elongated member with the gooseneck trailer 18. The driver continues to drive the truck towards the gooseneck trailer until the gooseneck trailer touches the elongated member 52. When the gooseneck trailer touches the elongated member, the gooseneck trailer touches the contact plate 80, thereby pivoting the plate toward the contact point 84. The plate then touches the contact point, enabling a connection to form between the light and a power source (such as the battery 94). With the plate touching the contact point, the light is then illuminated, which provides a warning to the driver that the gooseneck trailer is touching the elongated member. When the light illuminates, the driver stops the truck and hitches the gooseneck trailer to the trailer hitch. The driver may then tow the trailer as desired.

Figure 6:
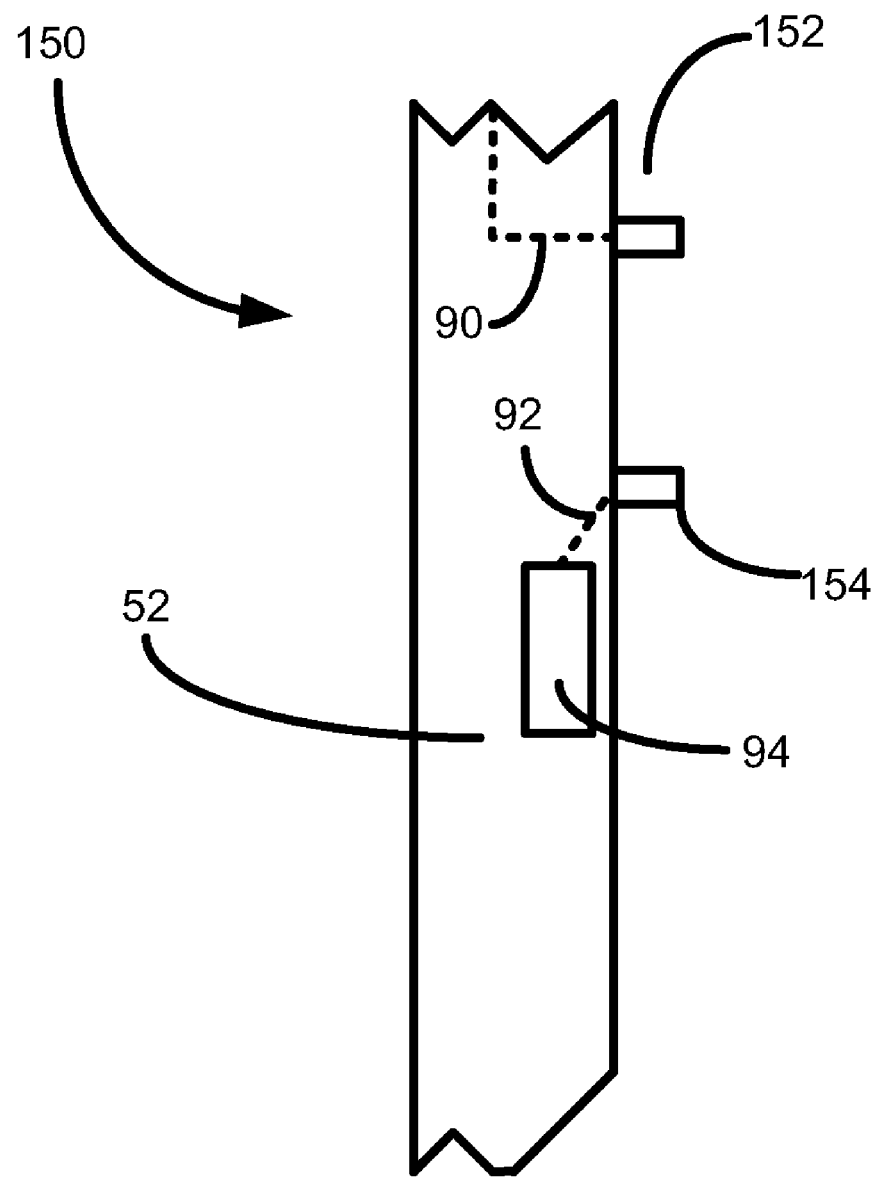
FIG. 6 is a side view of an alignment apparatus in an alternate embodiment of the present invention.
Figure 7:
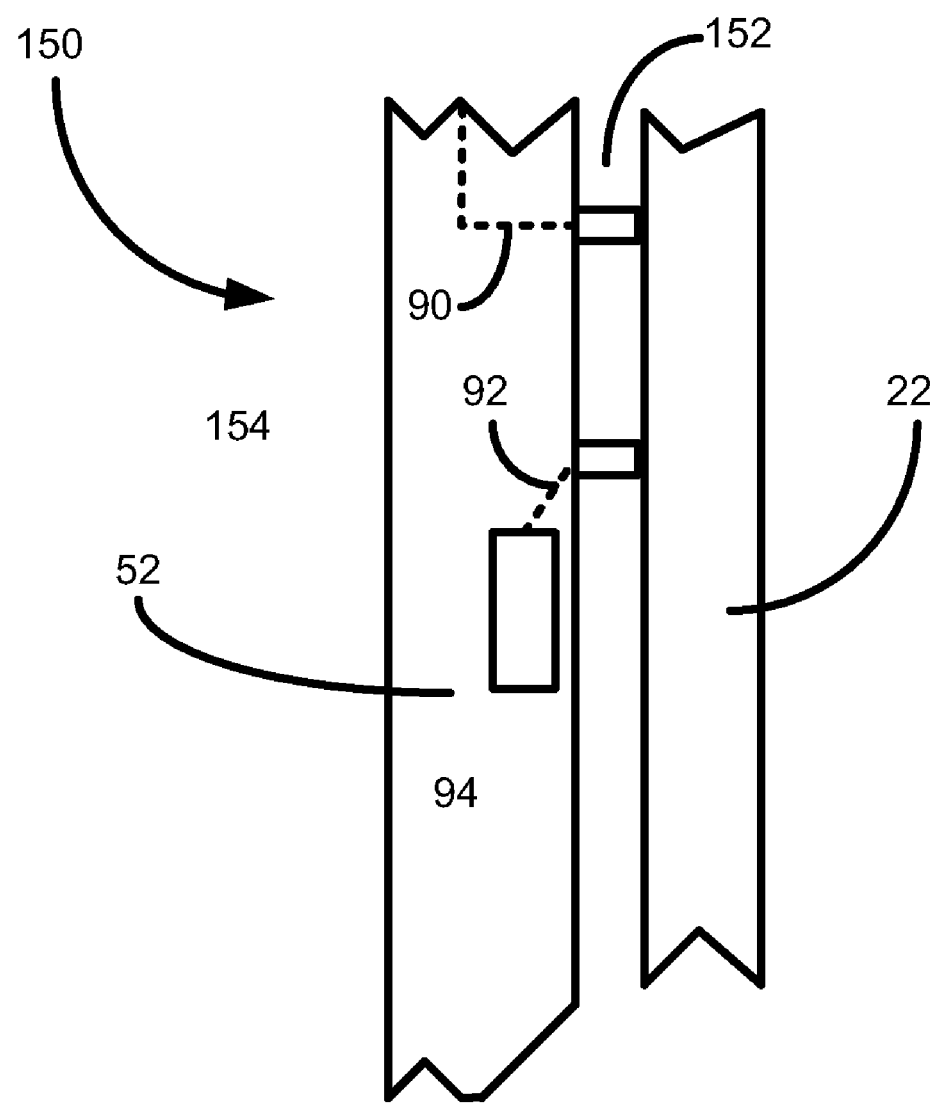
FIG. 7 illustrates a side view when the towing extension contacts the extensions.

FIG. 6 is a side view of an alignment apparatus 150 in an alternate embodiment of the present invention. The alignment apparatus may include an elongated member 50, an optional spring 72, a base 62, a light 60 and two extensions 152 and 154. The towing extension 22 may be constructed of metal and include an outer surface 160. FIG. 7 illustrates a side view when the towing extension 22 contacts the extensions 152 and 154. When the gooseneck trailer 18 contacts the extensions, a connection is formed between the light and its power source, which is broken when the towing extension is not touching both the extensions 152 and 154.

Figure 8:
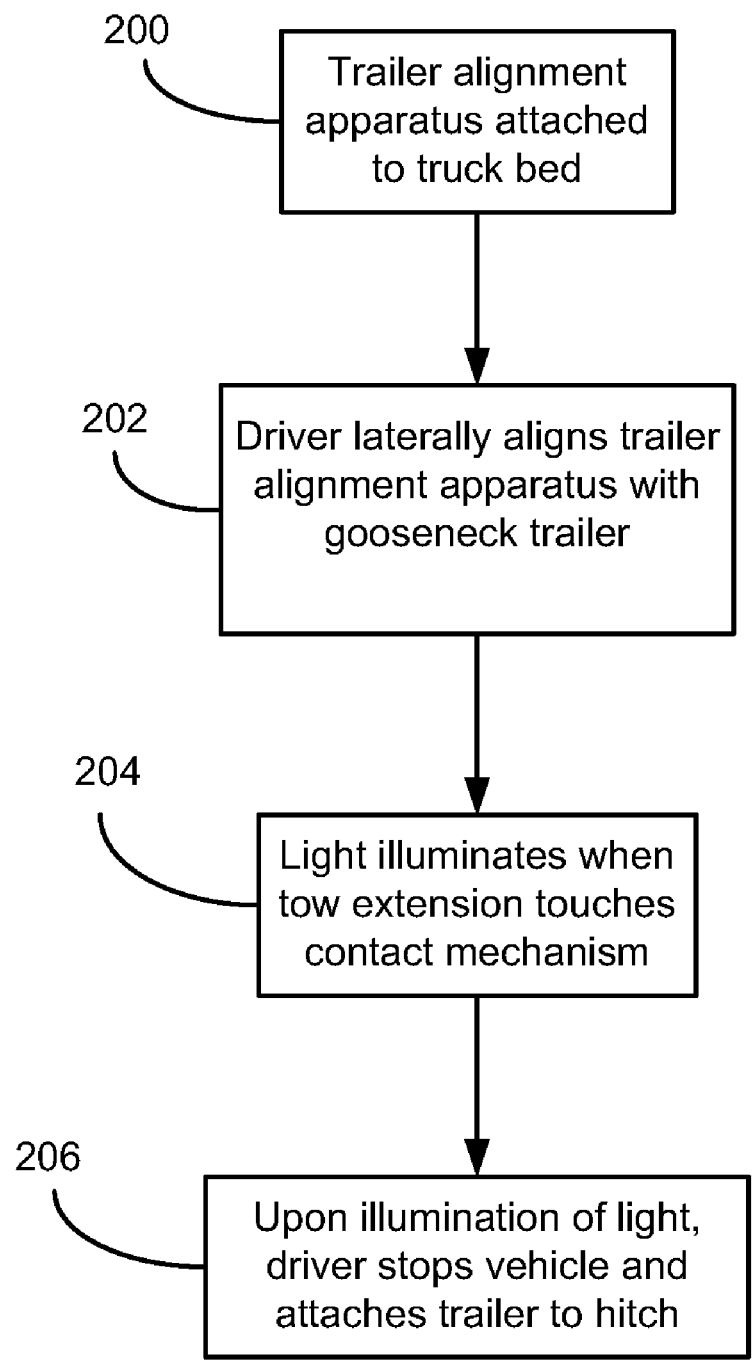
FIG. 8 is a flowchart illustrating the steps of aligning a gooseneck trailer with the trailer hitch according to the teachings of the present invention.

FIG. 8 is a flowchart illustrating the steps of aligning a gooseneck trailer with the trailer hitch 16 according to the teachings of the present invention. In step 200, the trailer alignment apparatus 50 is attached to the truck bed 14. In one embodiment, the alignment apparatus is attached by using a magnet 70 in the base 62. The base is then mounted on the truck bed 14, whereby the magnetic force of the magnet on the steel truck bed holds the alignment apparatus in place. The alignment apparatus is positioned adjacent and just behind the gooseneck trailer hitch 16 affixed to the truck bed (between the driver of the truck and the trailer hitch). With the alignment apparatus in place, the elongated member 52 extends out of the truck bed to provide a visual position of the hitch 16 lying in the truck bed. Next, in step 202, the driver laterally aligns the elongated member with the gooseneck trailer 18. The driver continues to drive the truck towards the gooseneck trailer until the gooseneck trailer touches the elongated member 52. In step 204, the light is illuminated when the gooseneck trailer touches the elongated member. In particular, when the gooseneck trailer touches the elongated member, the gooseneck trailer touches the contact plate 80, thereby pivoting the plate toward the contact point 84. The plate then touches the contact point, enabling a connection to form between the light and a power source (such as a battery). With the plate touching the contact point, the light is then illuminated, which provides a warning to the driver that the gooseneck trailer is touching the elongated member. In step 206, when the light illuminates, the driver stops the truck and hitches the gooseneck trailer to the trailer hitch. The driver may then tow the trailer as desired.

Although the present invention is illustrated with a truck, the present invention may be utilized with any towing vehicle. In addition, the present invention is not limited to gooseneck towing configurations. The present invention may also be used in "fifth wheel" towing systems and still remaining in the scope of the present invention.

The present invention provides many advantages for users of a gooseneck towing system. The present invention enables a driver to easily align a towing vehicle with a gooseneck trailer. The present invention provides lateral guidance as well as a warning when the gooseneck trailer is in a position to be attached to the hitch. The present invention may be easily attached and removed as necessary by the user.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A trailer alignment apparatus for aligning a trailer with a hitch on a vehicle, the apparatus comprising:
    an elongated member having an upper end and an opposite lower end;
    a light located on the upper end;
    a base locating on the lower end, the base having means for attaching to a base surface of the vehicle;
    wherein the elongated member is sized for a portion of the elongated member to be visible when the base is seated on the base surface of the vehicle;
    a contact mechanism for sensing when a portion of the elongated member is touched by the trailer, the contact mechanism coupled to the light;
    wherein the light illuminates when the contact mechanism senses the trailer touching the contact mechanism;
    wherein the contact mechanism includes two extensions attached to an outer surface of the elongated member and wherein a connection is formed when the trailer touches both extensions;
    whereby a driver of the vehicle laterally aligns the elongated member with the trailer and stops the vehicle when the light illuminates.

2. The trailer alignment apparatus according to claim 1 wherein the lower end includes a spring affixed to an upper side of the base.

3. The trailer alignment apparatus according to claim 1 wherein the contact mechanism includes a movable plate attached to an outer surface of the elongated member.

4. The trailer alignment apparatus according to claim 3 wherein the movable plate is biased to an opened position, the plate moving towards the outer surface of the elongated member when contacting another object.

5. The trailer alignment apparatus according to claim 4 wherein when the plate is in a closed position, a connection is established between a power source and light, thereby illuminating the light.

6. The trailer alignment apparatus according to claim 1 wherein the means for attaching to the base surface of the vehicle includes embedding a magnet in the base.

7. The trailer alignment apparatus according to claim 1 wherein the base is contoured to the base surface of the vehicle.

8. The trailer alignment apparatus according to claim 7 wherein the base surface of the vehicle is a truck bed.

9. The trailer alignment apparatus according to claim 1 wherein the trailer alignment apparatus is utilized for gooseneck trailers.

10. A method of aligning a vehicle with a trailer using an alignment apparatus, the alignment apparatus having an elongated member with a light on an upper side and a base attachable to a base surface of the vehicle on a lower side, the method comprising the steps of:
    attaching the alignment apparatus to the base surface of the vehicle;
    moving the vehicle laterally to laterally align the alignment apparatus with the trailer;
    backing the vehicle toward the trailer until the elongated member of the alignment apparatus contacts the trailer;
    illuminating the light when the trailer contacts an outer surface of the elongated member;
    wherein the step of illuminating the light when the trailer contacts the outer surface of the elongated member, the steps of:
        affixing two extensions to the outer surface of the elongated member; and
        forming a connection between the light and a power source when the trailer touches both extensions; and
    upon seeing the illuminated light, stopping the vehicle.

11. The method according to claim 10 further comprising the step, after stopping the vehicle, the step of hitching the trailer to the vehicle.

12. The method according to claim 10 wherein the step of illuminating the light when the trailer contacts the outer surface of the elongated member, the steps of:
    affixing a movable plate to the outer surface, the movable plate being biased to an opened position; and
    forming a connection between the light and a power source when the moveable plate is touched.

13. A trailer alignment system for aligning a trailer with a hitch on a vehicle, the system comprising:
    a vehicle having a hitch;
    a gooseneck trailer;
    a trailer alignment apparatus for aligning the trailer with the hitch in the vehicle, the apparatus comprising:
        an elongated member having an upper end and an opposite lower end;
        a light located on the upper end;
    a base locating on the lower end, the base having means for attaching to a base surface of the vehicle;
        wherein the elongated member is sized for a portion of the elongated member to be visible when seated on the base surface of the vehicle;
        a contact mechanism for sensing when a portion of the elongated member is touched by the trailer, the contact mechanism coupled to the light;
    wherein the light illuminates when the contact mechanism senses the trailer touching the contact mechanism;
    wherein the contact mechanism includes two extensions attached to an outer surface of the elongated member and wherein a connection is formed when the trailer touches both extensions;

whereby a driver of the vehicle laterally aligns the elongated member with the trailer and stops the vehicle when the light illuminates.

14. The trailer alignment system according to claim 13 wherein the contact mechanism includes a movable plate attached to an outer surface of the elongated member.

15. The trailer alignment system according to claim 14 wherein the movable plate is biased to an opened position, the plate moving towards the outer surface of the elongated member when contacting another object.

16. The trailer alignment system according to claim 15 wherein when the plate is in a closed position, a connection is established between a power source and light, thereby illuminating the light.

17. The trailer alignment apparatus according to claim 13 wherein the base surface of the vehicle is a truck bed.

* * * * *